United States Patent
Kim et al.

(10) Patent No.: US 9,674,773 B2
(45) Date of Patent: Jun. 6, 2017

(54) METHOD AND APPARATUS FOR REPORTING PROXY INFORMATION

(71) Applicant: LG ELECTRONICS INC., Seoul (KR)

(72) Inventors: Sangwon Kim, Seoul (KR); Jaewook Lee, Seoul (KR); Youngdae Lee, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/889,699

(22) PCT Filed: May 2, 2014

(86) PCT No.: PCT/KR2014/003924
§ 371 (c)(1),
(2) Date: Nov. 6, 2015

(87) PCT Pub. No.: WO2014/182011
PCT Pub. Date: Nov. 13, 2014

(65) Prior Publication Data
US 2016/0127982 A1 May 5, 2016

Related U.S. Application Data

(60) Provisional application No. 61/821,665, filed on May 9, 2013.

(51) Int. Cl.
*H04W 4/00* (2009.01)
*H04W 48/16* (2009.01)
(Continued)

(52) U.S. Cl.
CPC ......... *H04W 48/16* (2013.01); *H04W 76/046* (2013.01); *H04W 84/045* (2013.01)

(58) Field of Classification Search
CPC .. H04W 48/16; H04W 76/046; H04W 84/045
(Continued)

(56) References Cited

U.S. PATENT DOCUMENTS 7,117,266 B2 * 10/2006 Fishman ................. H04L 29/06
                                                        709/213
7,508,799 B2 *  3/2009 Sumner ............... H04L 63/0428
                                                        370/338
(Continued)

FOREIGN PATENT DOCUMENTS

KR    10-2010-0016881 A    2/2010
KR    10-2010-0048918 A    5/2011
(Continued)

OTHER PUBLICATIONS

Interdigital Communications, Alcatel-Lucent, Alcatel Lucent Shanghai Bell: "Proximity based Small Cell Discovery in Heterogeneous Networks", 3GPP TSG-RAN WG2 Meeting #81b, R2-131131, Apr. 14-19, 2013.
(Continued)

*Primary Examiner* — Marceau Milord
(74) *Attorney, Agent, or Firm* — Dentons US LLP

(57) ABSTRACT

Provided are a method and a wireless device for reporting proxy information in a wireless communication system. As the wireless device enters the proximity of a first target cell on a target frequency, the wireless device reports first proxy information indicating entering the proximity to a serving cell. Before the wireless device transmits proxy information indicating leaving the proximity after reporting the first proxy information, the wireless device does not report proxy information on entering the proximity of any other target cell on the target frequency.

14 Claims, 4 Drawing Sheets

(51) Int. Cl.
*H04W 76/04* (2009.01)
*H04W 84/04* (2009.01)

(58) Field of Classification Search
USPC .................................................. 455/434, 436
See application file for complete search history.

(56) References Cited

U.S. PATENT DOCUMENTS

| | | | | |
|---|---|---|---|---|
| 7,580,362 | B2* | 8/2009 | Timus | H04W 24/10 370/252 |
| 8,229,440 | B2* | 7/2012 | Yoon | H04W 36/08 370/328 |
| 8,909,228 | B2* | 12/2014 | Lee | H04W 24/10 370/328 |
| 8,954,051 | B2* | 2/2015 | Tinnakornsrisuphap | H04W 36/04 370/331 |
| 9,344,937 | B2* | 5/2016 | Jung | H04W 8/08 |
| 2008/0043672 | A1* | 2/2008 | Sebire | H04W 36/0055 370/331 |
| 2010/0323720 | A1* | 12/2010 | Jen | H04B 7/2606 455/456.1 |
| 2011/0149913 | A1* | 6/2011 | Park | H04W 36/0083 370/332 |
| 2013/0165120 | A1* | 6/2013 | Nylander | H04W 8/08 455/436 |
| 2013/0260741 | A1* | 10/2013 | Yamada | H04W 24/00 455/422.1 |

FOREIGN PATENT DOCUMENTS

| | | |
|---|---|---|
| KR | 10-2011-0049694 A | 5/2011 |
| KR | 10-2011-0103143 A | 9/2011 |
| WO | 2012-138094 A2 | 10/2012 |

OTHER PUBLICATIONS

LG Electronics Inc.: "Autonomous search function based small cell discovery", 3GPP TSG-RAN WG2 #81bis, R2-131446, Apr. 15-19, 2013.

* cited by examiner

METHOD AND APPARATUS FOR REPORTING PROXY INFORMATION

This application is a 35 USC §371 National Stage entry of International Application No. PCT/KR2014/003924 filed on May 2, 2014, which claims priority to U.S. Provisional Application No. 61/821,665, filed on May 9, 2013, all of which are incorporated by reference in their entirety herein.

BACKGROUND OF THE INVENTION

Field of the Invention

The present invention relates to wireless communications, and more particularly, to a method and apparatus for reporting proxy information in a wireless communication system.

Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

With the advancement of wireless communications, various types of cells are introduced to provide various types of services to a user. For example, a closed subscriber group (CSG) cell provides a high-quality quality of service (QoS) to a specific subscriber. A micro cell such as a pico cell, a femto cell, etc., is used to disperse many users concentrated in a small coverage.

A network topology is generally fixed in the conventional wireless communication system. A cell deployment is fixed in a specific region.

However, the micro cell is deployed freely and is movable. Therefore, a service provider needs to recognize which cell is present around the user.

Proxy information is used when a user equipment reports to a network whether a CSG cell is located nearby. However, since only a CSG cell which is accessible by only a limited subscriber is considered in the conventional proxy information reporting, it may be ineffective to apply various types of cells.

SUMMARY OF THE INVENTION

The present invention provides a method and apparatus for reporting proxy information in a wireless communication system.

In an aspect, A proxy information reporting method performed by a wireless device in a wireless communication system, the method comprising, when entering a proximity of a first target cell on a target frequency, reporting first proxy information indicating the entering the proximity to a serving cell and when leaving a proximity of any target cell on the target frequency after reporting the first proxy information, reporting second proxy information indicating the leaving the proximity to the serving cell.

Proxy information regarding the entering the proximity of any other target cell on the target frequency may be not reported until the second proxy information indicating the leaving the proximity is sent after reporting the first proxy information.

The reporting of the second proxy information to the serving cell may further comprise: starting a suspension timer when leaving the proximity of the first target cell and reporting to the serving cell the second proxy information indicating the leaving the proximity when the suspension timer expires.

In another aspect, A wireless device for reporting proxy information, comprising: a radio frequency (RF) unit for transmitting and receiving a radio signal and a processor operatively coupled to the RF unit, wherein the processor is configured for: when entering a proximity of a first target cell on a target frequency, reporting first proxy information indicating the entering the proximity to a serving cell and when leaving a proximity of any target cell on the target frequency after reporting the first proxy information, reporting second proxy information indicating the leaving the proximity to the serving cell.

A signaling overhead caused by frequent reporting of proxy information can be decreased.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device and may be referred to as another terminology, such as an evolved node-B (eNB), a base transceiver system (BTS), an access point, etc.

Hereinafter, the present invention is applied based on a $3^{rd}$ generation partnership project (3GPP) long term evolution (LTE) or a 3GPP LTE-Advanced (LTE-A). This is for exemplary purposes only, and thus the present invention is applicable to various communication systems. In the following description, LTE and/or LTE-A are collectively referred to as LTE.

Figure 1:
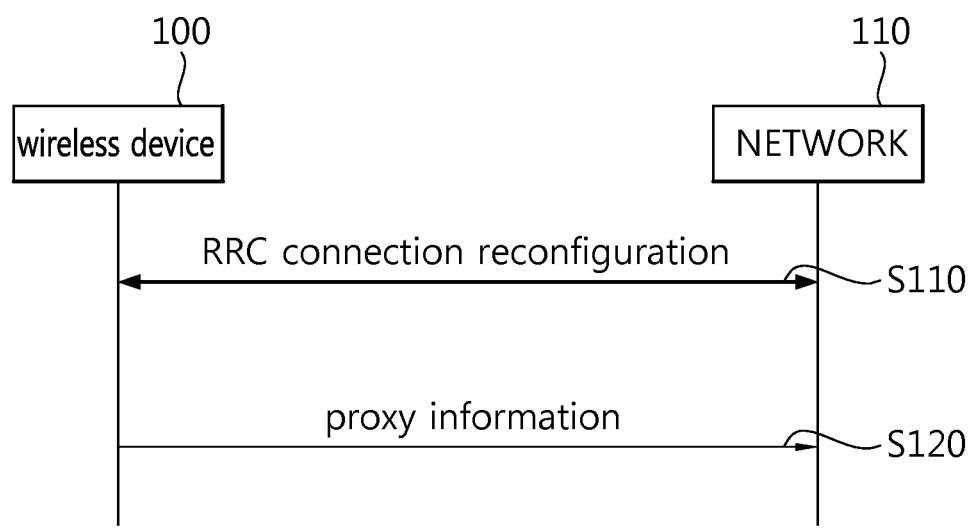
FIG. 1 shows a method of reporting proxy information according to the conventional technique.

FIG. 1 shows a method of reporting proxy information according to the conventional technique. The section 5.3.14 of 3GPP TS 36.331 V11.3.0 (March 2013) may be incorporated herein by reference.

The proxy information indicates whether a wireless device enters or leaves a proximity of a CSG member cell having the wireless device as a member.

In step S110, the wireless device establishes an RRC connection configuration or RRC connection reconfiguration with respect to a network. The network may include a universal terrestrial radio access network (UTRAN) or an evolved-UTRAN (E-UTRAN). A frequency on which the E-UTRAN operates may be referred to as an E-UTRA frequency, and a frequency on which the UTRAN operates may be referred to as a UTRA frequency.

In step S120, the wireless device sends the proxy information to the network if a specific condition is satisfied. The specific condition includes a case where the wireless device leaves or enters the proximity of the CSG member cell on a specific frequency (i.e., the E-UTRA frequency or the UTRA frequency).

The reporting of the proxy information may also be utilized in an inter-frequency cell measurement. The proxy information is not limited to only indicating whether to leave or enter a proximity of a CSG cell, and thus may also indicate whether to leave or enter a proximity of another type of a cell (e.g., a pico cell, a femto cell, etc.).

However, there are several problems when the conventional method of reporting the proxy information is applied to various cells.

According to the conventional method, the proxy information is reported whenever the wireless device leaves or enters the proximity of the cell. However, in case of a pico cell which is densely deployed in general, the proxy information may be excessively frequently reported.

In addition, due to a high density of the cell, the wireless device may enter again the proximity of the pico cell immediately after leaving the proximity of the pico cell. This is a case where leaving of the proximity of the pico cell is not necessarily reported.

It is proposed to report the proximity according to a more restricted condition, instead of reporting the proximity whenever the wireless device leaves or enters the proximity of the pico cell.

Hereinafter, a serving cell is a cell in which a wireless device reports proxy information. The serving cell may be a cell in which the wireless device establishes an RRC connection. A target cell is a cell in which the wireless device confirms a proximity. A target frequency is a frequency on which the target cell operates. The target cell may include a cell having a small coverage in general, such as a pico cell, a femto cell, and a small cell. The target cell may include a special purpose cell such as a CSG cell, a cell for data offloading, etc. Although the pico cell is taken as an example of the target cell hereinafter, the present invention is not limited thereto.

Now, reporting of proxy information when entering a proximity will be described.

When a wireless device enters a proximity of a first pico cell on a first frequency, first proxy information indicating 'entering the proximity' may be reported. After reporting the first proxy information, the wireless device may not report proximity information regarding entering a proximity of any other pico cell on the first frequency until second proxy information indicating 'leaving the proximity' of the first pico cell is sent. After reporting the first proxy information, the wireless device may report the proximity information indicating 'leaving the proximity' when leaving the proximity of the any pico cell on the first frequency.

The proxy information may include at least one of a type field, a frequency field, and a cell field. The type field indicates 'entering the proximity' or 'leaving the proximity'. The frequency field indicates a frequency of a corresponding cell. The cell field indicates a cell in which the proximity is reported.

The proxy information may be included in a radio resource control (RRC) message.

Even if the wireless device leaves the proximity of the pico cell, the wireless device may not send a message indicating 'leaving the proximity' unless it leaves the proximity of other pico cells.

After transmitting the first proxy information, the wireless device may receive a measurement control from a serving cell. The measurement control may include information regarding a frequency on which the measurement will be performed.

Even in case of entering a proximity of any other pico cell on a specific frequency after transmitting the first proxy information, the wireless device may not send a message indicating 'entering the proximity' when the specific frequency is set for the measurement.

The reporting of the proxy information may be prohibited for each frequency and/or cell. Herein, the 'prohibition' may imply that the proxy information is not sent at all or the proxy information is sent only depending on a condition according to the proposed embodiment. A network may send a prohibited list to the wireless device. The proxy information may be reported in a limited manner according to the aforementioned embodiment only for a frequency and/or cell included in the prohibited list.

Figure 2:
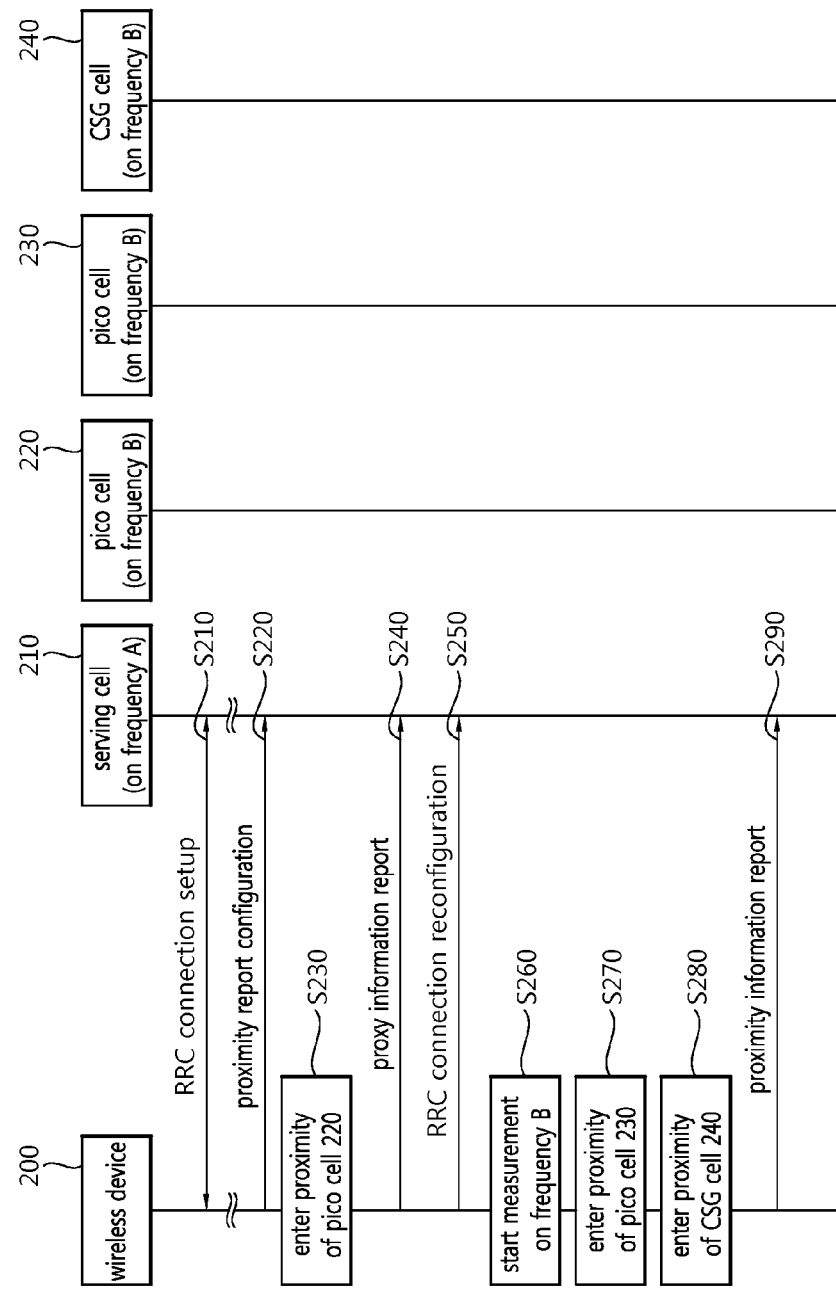
FIG. 2 is a flowchart showing a method of reporting proxy information according to an embodiment of the present invention.

FIG. 2 is a flowchart showing a method of reporting proxy information according to an embodiment of the present invention.

In step S210, a wireless device 200 establishes an RRC connection with respect to a serving cell 210.

In step S220, the wireless device 200 receives a proximity report configuration from the serving cell 210. The proximity report configuration may include a prohibited list having information regarding a cell in which reporting of the proximity information is restricted. In this example, the prohibited list includes a first pico cell 220 and a second pico cell 230, but does not include a CSG cell 240.

In step S230, the wireless device 200 may first enter a proximity of the first pico cell 220, and may confirm whether the prohibited list is included in the first pico cell 220.

In step S240, the wireless device 200 reports proxy information indicating the entering the proximity of the first pico cell 220 to the serving cell. The wireless device 200 may report the proxy information when an operating frequency B of the first pico cell 220 is not set to a measurement object.

In step S250, the serving cell 210 may configure the wireless device 200 to perform a measurement on the frequency B through an RRC connection reconfiguration message.

In step S260, the wireless device 200 performs the measurement on the frequency B.

In step S270, the wireless device 200 enters a proximity of the second pico cell 230, and confirms that the second pico cell 230 is included in the prohibited list. Therefore, the wireless device 200 does not report the proxy information.

In step S280, the wireless device 200 enters a proximity of the CSG cell 240, and confirms that the CSG cell 240 is not included in the prohibited list.

In step S290, the wireless device 200 reports proxy information indicating entering the proximity of the CSG cell 240 to the serving cell.

Upon detecting leaving the proximity of the second pico cell 230, the wireless device 200 may report proxy information indicating the leaving the proximity to the serving cell. A suspension timer described hereinafter is applicable in the present embodiment, which will be described below.

Once the proxy information regarding the entering a proximity of any one cell in the prohibited list is reported, the proxy information is not reported even if entering a proximity of any other cell in the prohibited list is detected. Therefore, frequent proxy information transmission can be prevented.

Now, reporting of proxy information when leaving a proximity will be described.

A wireless device may suspend the reporting of the proxy information during a suspension timer is running.

The suspension timer may start when leaving a proximity of a target cell on a target frequency. The suspension timer may be set for each target frequency or target cell.

A cell to which the suspension timer is applied may be restricted. For example, the suspension timer may be applied to a cell included in the aforementioned prohibited list.

For example, a leaving condition may be as follows.
When the wireless device leaves a proximity of one or more target cells on a target frequency.
When the wireless device does not previously transmit proxy information on the target frequency, or a specific time (e.g., 5 seconds) elapses after the proxy reporting is last transmitted.

If the suspension timer expires, the wireless device may transmit the proxy information.

If the wireless device enters a proximity of a specific cell, the suspension timer may stop. In addition, the wireless device may discard suspended proxy information.

The suspension timer may be set for each frequency. If the wireless device enters a proximity of a cell of a specific frequency during the suspension timer is running, a suspension timer for the specific frequency may stop.

Figure 3:
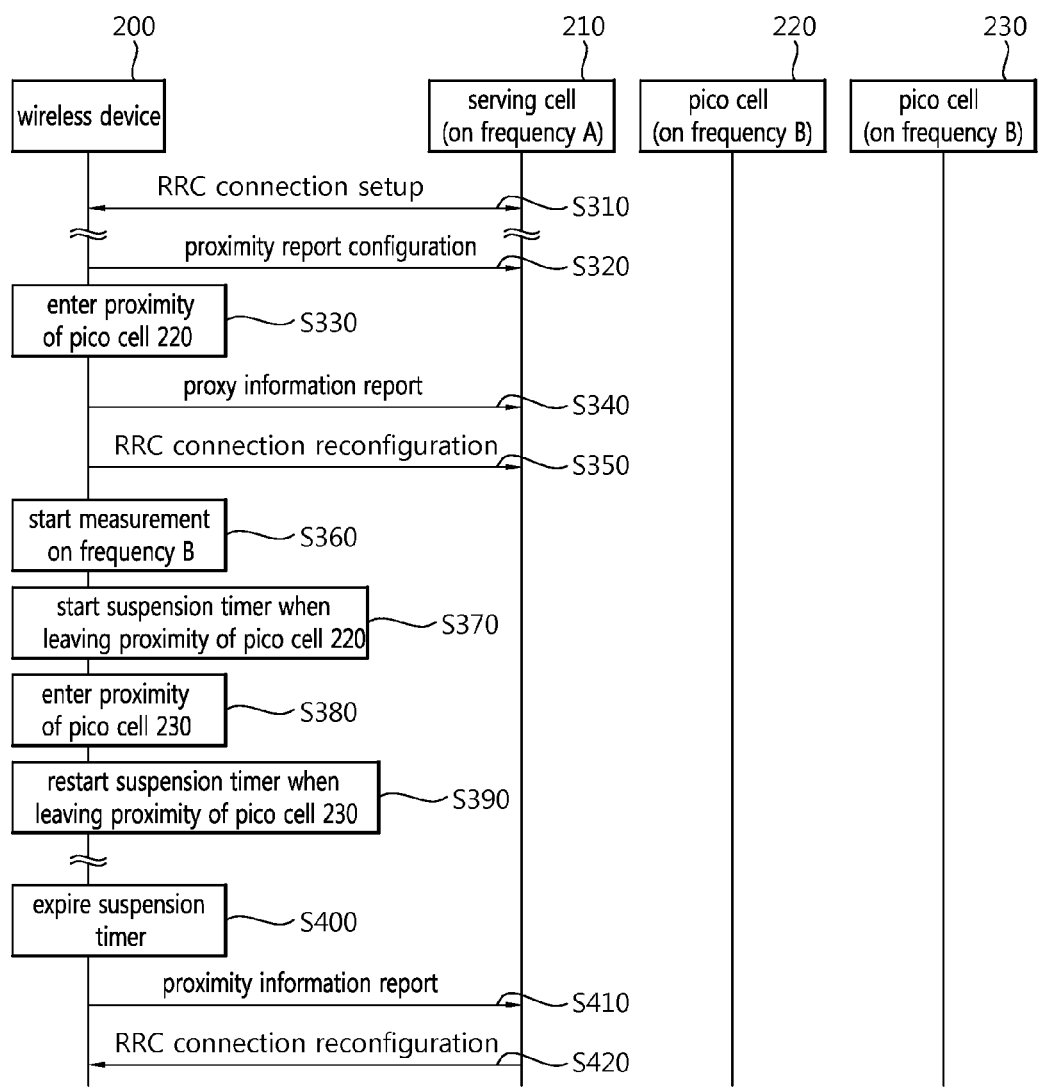
FIG. 3 is a flowchart showing a method of reporting proxy information according to another embodiment of the present invention.

FIG. 3 is a flowchart showing a method of reporting proxy information according to another embodiment of the present invention.

In step S310, a wireless device 200 establishes an RRC connection with respect to a serving cell 210.

In step S320, the wireless device 200 receives a proximity report configuration from the serving cell 210. The proximity report configuration may include a suspending list having information regarding a cell or frequency to which a suspension timer is applied. In this example, the suspending list designates a frequency B. That is, the suspension timer is applied to a cell operating on the frequency B. Alternatively, if it is assumed that the suspending list designates a cell to which the suspension time is applied, a first pico cell 220 and a second pico cell 230 may be included in the suspending list in this example.

In step S330, the wireless device 200 enters a proximity of the first pico cell 220.

In step S340, the wireless device 200 reports proxy information indicating entering the proximity of the first pico cell 220 to the serving cell.

In step S350, the serving cell 210 may configure the wireless device 200 to perform a measurement on the frequency B through an RRC connection reconfiguration message.

In step S360, the wireless device 200 performs the measurement on the frequency B.

In step S370, since the wireless device 200 leaves the proximity of the first pico cell 220, a suspension timer starts. The wireless device 200 may confirm that the frequency B of the first pico cell 220 is included in the suspending list. After the suspension timer starts, the proxy information regarding the leaving the proximity of the first pico cell 220 is not reported until the suspension timer expires.

In step S380, the wireless device 200 enters the proximity of the second pico cell 230, and the suspension timer for the frequency B stops. Since the second pico cell also belongs to the frequency B, the suspension timer is applied. The proxy information regarding the entering the proximity of the second pico cell 230 may be discarded without being reported.

In step S390, since the wireless device 200 leaves the proximity of the second pico cell 230, the suspension timer starts.

In step S400, the suspension timer expires.

In step S410, the wireless device 200 reports to the serving cell the proxy information indicating the leaving the proximity.

In step S420, the serving cell 210 may configure the wireless device 200 not to perform the measurement any more on the frequency B through an RRC connection reconfiguration message.

The proxy information is not reported during the suspension timer is running. Therefore, excessive proxy information reporting caused by frequent entering/leaving the proximity can be avoided.

The aforementioned embodiments may be performed independently or in combination. The embodiment of FIG. 2 and the embodiment of FIG. 3 may be combined.

The serving cell 210 may send both of the prohibited list and the suspending list to the wireless device 200. The embodiment of FIG. 2 may be applied to a cell/frequency belonging to the prohibited list, and the embodiment of FIG. 3 may be applied to a cell/frequency belonging to the suspending list.

One combined list may be given to the wireless device 200 without having to distinguish the prohibited list and the suspending list. The embodiments of FIG. 2 and FIG. 3 may be both applied to a cell/frequency belonging to the combined list. For example, the embodiment of FIG. 2 may be applied upon detecting entering a proximity of a pico cell belonging to the combined list, and the embodiment of FIG. 3 may be applied upon detecting leaving the proximity of the pico cell belonging to the combined list.

Figure 4:
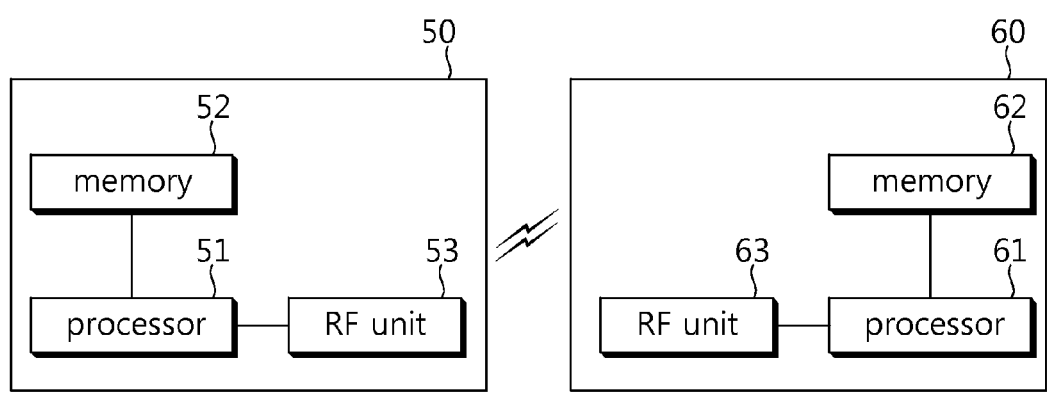
FIG. 4 is a block diagram showing a wireless communication system according to an embodiment of the present invention.

FIG. 4 is a block diagram showing a wireless communication system according to an embodiment of the present invention.

A wireless device 50 may include a processor 51, a memory 52, and a radio frequency (RF) unit 53.

The processor 51 implements the aforementioned operation of the wireless device 200. In the embodiments of FIG. 2 and FIG. 3, the operation of the wireless device 200 may be implemented by the processor 51.

The memory 52 stores instructions for the operation of the processor 51. The stored instructions may be executed by the processor 51, and may be implemented to perform the aforementioned operation of the wireless device 200.

The RF unit 53 transmits and receives a radio signal. The processor 51 may instruct the RF unit 53 to receive or transmit the aforementioned message or data.

A BS 60 may include a processor 61, a memory 62, and an RF unit 63.

The processor 61 implements the aforementioned operation of the serving cell 210. In the embodiments of FIG. 2 and FIG. 3, the operation of the serving cell 210 may be implemented by the processor 61.

The memory 62 stores instructions for the operation of the processor 61. The stored instructions may be executed by the processor 61, and may be implemented to perform the aforementioned operation of the serving cell 210.

The RF unit 63 transmits and receives a radio signal. The processor 51 may instruct the RF unit 63 to receive or transmit the aforementioned message or data.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for reporting proxy information in a wireless communication system, the method performed by a user equipment (UE) and comprising:
    receiving proximity indication configuration information which includes suspending timer information for a suspension timer;
    when entering, by the UE, a proximity of a first target cell on a target frequency, reporting, from the UE to a serving cell, first proxy information indicating that the UE has entered the proximity of the first target cell;
    starting the suspension timer when the UE leaves the proximity of the first target cell,
    wherein if the suspension timer is running, the UE does not transmit any proxy information indicating that the UE has entered a proximity of any target cell on the target frequency when the UE enters the proximity of the any target cell; and
    when the suspension timer expires, reporting, to the serving cell, second proxy information indicating that the UE has left the proximity of the any target cell after the UE leaves the proximity of the any target cell.

2. The method of claim 1, wherein if the suspension timer is running, the UE does not transmit any proxy information indicating that the UE leaves the proximity of the any target cell when the UE leaves the proximity of the any target cell.

3. The method of claim 1, wherein the suspension timer stops when the UE enters the proximity of a second target cell on the target frequency.

4. The method of claim 3, wherein the suspension timer is set for the target frequency.

5. The method of claim 4, wherein the stopped suspension timer restarts when the UE leaves the proximity of the second target cell.

6. The method of claim 3, wherein when the target frequency is set to a measurement object, the UE does not transmit the proximity information indicating that the UE enters the proximity of the second target cell while the suspension timer is running.

7. The method of claim 1, wherein the method further comprises receiving, from the serving cell, a proximity report configuration which indicates the second target cell to which the suspension timer is applied.

8. A user equipment (UE), the UE comprising:
    a radio frequency (RF) unit that transmits and receives a radio signal; and
    a processor operatively coupled to the RF unit, that:
    controls the RF unit to receive proximity indication configuration information which includes suspending timer information for a suspension timer;
    reports, to a serving cell, first proxy information indicating that the UE has entered a proximity of a first target cell on a target frequency, when the UE enters the proximity of the first target cell;
    starts a suspension timer when the UE leaves the proximity of the first target cell,
    wherein if the suspension timer is running, the UE does not transmit any proxy information indicating that the UE enters a proximity of any target cell on the target frequency when the UE enters the proximity of the any target cell, and
    when the suspension timer expires, reports, to the serving cell, second proxy information indicating that the UE has left the proximity of the any target cell after the UE leaves the proximity of the any target cell.

9. The UE of claim 8, wherein if the suspension timer is running, the UE does not transmit any proxy information indicating that the UE leaves the proximity of the any target cell when the UE leaves the proximity of the any target cell.

10. The UE of claim 8, wherein the suspension timer stops when the UE enters the proximity of a second target cell on the target frequency.

11. The UE of claim 10, wherein the suspension timer is set for the target frequency.

12. The UE of claim 11, wherein the stopped suspension timer restarts when the UE leaves the proximity of the second target cell.

13. The UE of claim 10, wherein when the target frequency is set to a measurement object, the UE does not transmit the proximity information indicating that the UE enters the proximity of the second target cell while the suspension timer is running.

14. The UE of claim 8, wherein the processor further controls the RF unit to receive, from the serving cell, a proximity report configuration which indicates the second target cell to which the suspension timer is applied.

* * * * *